THIN FILM COATING FOR SUNGLASSES

Original Filed March 4, 1968 4 Sheets-Sheet 1

PAUL B. MAUER
INVENTOR.
BY Walter O. Robinson
Paul P. Holmes
Arthur L. Girard
ATTORNEYS

THIN FILM COATING FOR SUNGLASSES

Original Filed March 4, 1968 4 Sheets-Sheet 2

PAUL B. MAUER
INVENTOR.
BY
Walter O. Hodsdon
Paul R. Holmes
Arthur L. Girard
ATTORNEYS

THIN FILM COATING FOR SUNGLASSES

Original Filed March 4, 1968 4 Sheets-Sheet 3

PAUL B. MAUER
INVENTOR.
Walter O. Hodsdon
BY Paul P. Holmes
Arthur L. Girard
ATTORNEYS PAUL B. MAUER
INVENTOR.
BY Walter O. Hodsdon
Paul R. Holmes
Arthur L. Girard
ATTORNEYS United States Patent Office Re. 27,473
Reissued Sept. 5, 1972

27,473

THIN FILM COATING FOR SUNGLASSES

Paul B. Mauer, Rochester, N.Y., assignor to Eastman Kodak Company, Rochester, N.Y.

Original No. 3,516,720, dated June 23, 1970, Ser. No. 715,464, Mar. 4, 1968. Application for reissue Oct. 21, 1970, Ser. No. 82,651
Int. Cl. B29d *11/00;* G02b *1/10, 3/00, 7/10*
U.S. Cl. 350—2 21 Claims

Matter enclosed in heavy brackets [ ] appears in the original patent but forms no part of this reissue specification; matter printed in italics indicates the additions made by reissue.

ABSTRACT OF THE DISCLOSURE

The present invention provides a multilayer article of manufacture for use in sunglasses which article consists of a thin metal foil "sandwiched" between two transparent layers of a material having an index of refraction approaching that of the metal foil, the outer surface of at least one of the transparent layers of the "sandwich" (preferably that which lies nearest the wearer's eye) being coated with a reflection-reducing material. The thin metal foil serves to filter infrared and ultraviolet rays while providing adequate transmission in the visible spectrum while the reflection-reducing material which preferably lies between the bulk of the article and the eye of the viewer serves to eliminate the back-reflectivity problem which has arisen in prior attempts to utilize thin metal foils as filters in similar sunglass applications.

The present invention relates to filter elements and more particularly to filter elements suitable for use in eye-protective applications.

While ultraviolet rays and infrared or heat rays have an injurious effect upon the eye, it is well known that only the light rays corresponding to the mid-spectrum (i.e. from about 400 mu to about 700 mu) are harmless to the human eye. A number of methods have already been suggested in an attempt to protect the eye from these injurious rays. This is particularly true in the sunglass and window glass arts.

The problem is that most commercial (eye protective) sunglasses and window glasses are characteristically poor in that they transmit excessive amounts of ultraviolet and/or infrared rays while attenuating the visible part of the solar spectrum. As a result, the eye responds to the attenuation of the visible range by dilation of the pupil and hence becomes subject to excessive energy intake in the form of infrared and ultraviolet rays.

Among the solutions which have been proposed for the above problem in addition to innumerable dye and plastic or glass compositions, is the proposal for the use of thin layers of metals such as gold, as disclosed in Downing U.S. Pat. 3,118,781, Tillyer U.S. Pat. 1,222,049, De Bayer-Krucsay U.S. Pat. 2,087,802 and Dreyfus U.S. Pat. 2,854,-349, to filter the infrared and ultraviolet rays from the spectrum. Such solutions have proved entirely satisfactory for such indoor applications as welding. However, when attempts are made to incorporate the concept in a sunglass for use in the out-of-doors or a window glass having large amounts of natural or artifical light emanating from behind it, a very definite problem occurs in the form of the "back reflecting" of the foil, i.e., the reflection of light emanating from the backside of the sunglass lens or the window glass back into the viewer's eye. This problem has resulted in the use of such thin metal foil optical elements in sunglasses of the conventional type and in window glasses of the eye-protective type, utilized in a variety of specialty applications being all but impracticable.

As should be clear from the above discussion, the ideal eye-protective filter element is one which transmits most highly in the visible region, where the eye can respond while excluding radiant energy of shorter and longer wave-lengths in the ultraviolet and infrared ranges as shown in FIG. 1. Thus, as eye response increases, transmittance of the ideal sunglass should also increase to some degree so that the eye may respond to protect itself against the invisible and harmful rays which it cannot detect.

Most manufacturers of conventional sunglasses attempt to accomplish shielding of the eye against the sun's rays by incorporating dyes of one type or another into the glass or the more usual plastic composition of the sunglass lens. The primary reason for commercial failure to produce an optimum sunglass material is that all plastic dyes characteristically tend to permit increased transmittance in the infrared range, as shown in FIG. 1. Also, while some glass additives are useful in suppressing infrared, such materials are generally expensive and the cheaper glass lenses do not contain them.

Thus, this invention augments or replaces the absorbtion of dyed plastics or colored glass with the novel properties of thin film of gold and copper. The transmittance of a typical gold film as shown in FIG. 2 compares most favorably with the ideal sunglass plot of FIG. 1.

It is therefore an object of the present invention to eliminate the above-described "back-reflectivity" problem by the development of a unique composite multilayer filter element which can eliminate the "back-reflectivity" problem.

Other objects and advantages of the present invention will be made obvious to those skilled in the art by the following description when considered in relation to the accompanying drawing in which.

According to the broader aspects of the present invention, there is provided an article of manufacture for use in eye protective sunglasses and window glasses comprising (a) a transparent substrate and (b) a filter element coated upon at least one side of said transparent substrate; said filter element comprising (1) a first transparent material layer; (2) a thin foil of a metal selected from the group consisting of gold and copper; (3) a second transparent material layer (which transparent material layers lie contiguous to opposing surfaces of the thin foil); and (4) a layer of reflection reducing material contiguous to the surface of at least one of the transparent material layers opposing the surface thereof which lies contiguous to the thin foil. The filter element may be oriented such that the reflection-reducing material layer lies contiguous to the substrate or remote therefrom.

The surface of the filter element opposing that which lies contiguous to the substrate may be coated with a clear protective overlayer, if desired, to protect the filter element from impact and abrasion.

Figure 3:
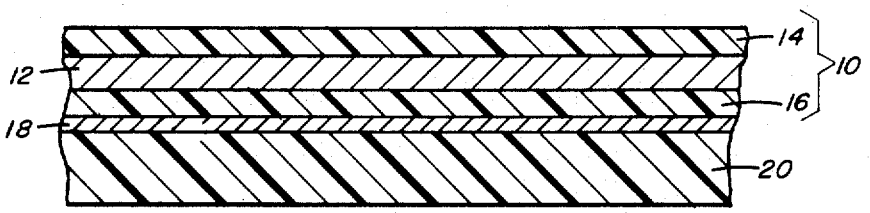
FIG. 3 is a cross-sectional view of a simplified article produced in accordance with the present invention.

The simplest embodiment of the present invention, as hown in cross section in FIG. 3, comprises a filter lement 10 made up of a thin metal foil 12 preferably f gold, "sandwiched" between two layers 14 and 16 of ransparent material. The outer surface of the second ransparent layer 16 having a layer 18 of a reflection educing material contiguous thereto, this latter layer erving to cut down the "back-reflectivity" caused by light which enters from the rear of the multilayer film structure and is, upon impinging upon the metal foil layer, eflected back into the eye of the viewer when the elenent is incorporated into a sunglass or window glass. The filter element is in turn contiguous to (or mounted ipon) a transparent substrate 20 which in the embodinent shown contacts the neutral-color absorbing layer 18.

Although there are a number of metal foils set forth n the prior art cited above which are suitable for filter urposes similar to those under consideration here (these nclude gold, silver, copper, and aluminum) only copper ind gold (and of these, gold is preferred) have been ound suitable for the present application.

The transparent layers may consist of a number of lifferent conventional materials suitable for this use in unglasses and well known to those skilled in the art.

Such materials generally include any transparent mate-ial having a high index of refraction, i.e. above about 1.5. As examples of such materials, titanium dioxide, ead oxide, bismuth oxide and, according to the preferred embodiment, zinc sulfide may be utilized as the transpar-nt layers.

The high index of refraction of the highly transparent naterial is of utmost importance in order to achieve optimum results in these applications, as it enhances the ransmittance of the metal foil, and in particular gold oil, by matching the optical constants of the sandwich, ind the foil thereby rendering them more optically compatible. This matching is achieved by reducing and in ome instances eliminating the effects of the interfaces between the foil layer and the transparent sandwich. Hence, the deposition of an additional $\sim\frac{1}{4}\lambda$ (at 550 mu) ayer of zinc sulfide on the surface of the gold film both increases the transmission of the gold film at the naxima and shifts this maxima to somewhat longer wavelengths in the green portion of the spectrum thus providing the relatively increased transmission in the visble spectrum, which was discussed above as being desirable.

Gold films which are suitable for use in the products of this invention provide a variety of color and tones lepending upon the thickness of the transparent layers and the conditions under which the thin foil is formed. The best foils for sunglasses are those which are deposited rapidly on a freshly evaporated film of a transparent naterial such as zinc sulfide at vaporizing temperatures of from about 1000 to about 1400° C. Thin films of gold prepared by vapor deposition in vacuum (or by other conventional means) are known to transmit light in the region of the spectrum from 450–600 mu. The wavelength at which the peak of this transmission ban occurs will vary depending on the substrate upon which the film is deposited, the rate of deposition and the thickness as described on pp. 505–508 of Holland, L., Vacuum Deposition of Thin Films. When the gold is overcoated with a film of the same or a different transparent material, the durable "sandwich" which is formed has a grey-green or straw color transmittance depending upon the optical thickness of the transparent layers.

The metallic foil of either copper or gold may be deposited in various manners, for instance by cathodic sputtering, by electrolysis or by a chemical method. However, the aforementioned vapor deposition by evaporation and condensation of the metal is preferred as providing the most uniform and optically perfect metal foil.

Although the thickness of the transparent "sandwich" layers may range considerably within reason, when one of the above two preferred metals, copper and especially gold is used as the metal foil, best results are obtained when the transparent layer thickness ranges from about 22 to about 50 mu, and the foil ranges in thickness from about 30 to about 70 mu. At these thicknesses, the coupling effect, which enhances the transmittance of the foil within the sandwich, is maximized, and, as will be explained later, the effectiveness of the neutral density transition metal filter material layer is further increased. Optimum results can be achieved when these two layers range in thickness from about 35 to about 45 mu and about 35 to about 60 mu, respectively.

The transparent layers may be formed according to any of the conventional techniques for forming such layers which are well known in the art. One such method of coating to form a layer of the material is by evaporation from the platinum boat in a vacuum at an elevated temperature. In the case of the preferred zinc sulfide material which must be of the very pure variety such as that prepared commercially for the fluorescent screen of cathode ray tubes, the evaporation temperature is about 1200° C. When this type of zinc sulfide is evaporated in this manner and thereafter baked at a temperature of 70° C. or higher for several hours, it is practically insoluble in water and alkaline solutions, is quite hard, and is clear and transparent through the visible spectrum.

As stated above, the most objectionable feature of the metal foil sunglass and window glass materials that were known prior to the present invention is their high reflectivity from the backside.

It has been discovered that this condition may be corrected by the application of a thin film of a reflection-reducing material having non-selective absorption properties such as nickel to the surface of the transparent material and foil sandwich which lies closest the eye of the wearer in the case of sunglasses and between the eye of the viewer and the thin metal foil when the article is incorporated into other eye-protective apparatuses.

The key properties which make a material especially useful in this reflection-reducing layer are values of optical index whose real and imaginary parts are comparable, i.e., within a factor of about 10 of each other. The layer of reflection-reducing material may consist of almost any of the metals not generally classed as alkali or alkaline earth metals, i.e. metals such as sodium, potassium and calcium. Specifically, titanium, iron and chromium are preferred in this reflection-reducing layer, however aluminum, lanthranum, indium, tin, lead, tantalum, tungsten, cobalt, molybdenum, osmium, iridium, platinum, yttrium, zirconium, niobium, zinc, cadmium, vanadium, hafnium, rhenium and thallium can also be used in this reflection-reducing layer. Semi-metals (i.e. elements which possess metallic and non-metallic properties) such as silicon, germanium, arsenic, antimony and tellurium have also been to be useful in this layer.

In addition to the above metals and semi-metal alloys thereof which have superior evaporation properties may also be use in this layer. In this regard, "Inconel" and other nickel alloys are specifically preferred.

The purpose of this reflection-reducing material layer is to reduce the above-described reflection of light from the backside of the foil filter layer. This, of course, is preferably accomplished by absorbing the light which may impinge the backside of the foil before reflection. Thus, although high absorption is a required and valuable property in this layer, a combination of absorption and transmittance of light which in turn is transmitted by the foil and not reflected back into the eye of the wearer as well as transmittance of light which passes through the foil filter is what is ideally sought to be achieved. A thin layer of nickel or alloys thereof has been found to produce a maximum advantage in this regard.

In order to further maximize the effectiveness of the back-reflection filter, the transparent material layer which lies between the foil and the back-reflection filter should approximate one-quarter of a wavelength of the reflected light in length. Thus, as set forth above, the thickness of the transparent layers should preferably range from about 30 to about 50 mu. Such a thickness of the transparent layer establishes interference between the incident and reflected light waves thus providing a cancelling effect which helps to maximize the effect of the "back-reflectivity" filter and hence to minimize the amount of reflected light.

In order to provide a transparent filter which does not itself significantly affect the transmittace of the foil and transparent material sandwich and thus does not produce undesired side effects as a sort of second and independent filter element, the thickness of the reflection-reducing layer should be kept to a relative effective minimum. Thicknesses of from about 5 to about 20 mu provide satisfactory results while thicknesses of from about 10 to about 18 mu are preferred.

The reflection-reducing layer may be applied directly to the substrate or the transparent layers by any of the methods noted above as suitable for the deposition of the gold foil layer. Furthermore, the substrate and/or the transparent layers may be subbed with a suitable "subbing" material to improve adhesion of the "back-reflectivity" filter material to the substrate or transparent layers or for purposes of insuring a clear interface between the metal and the contiguous members of the article.

It has been noted that when the above-described thickness ranges are observed for the reflection-reducing layer, the back reflectivity of "sandwiched" foil type articles produced in accordance with this invention may be reduced to values below those encountered in common glass or optical lenses.

Figure 7:
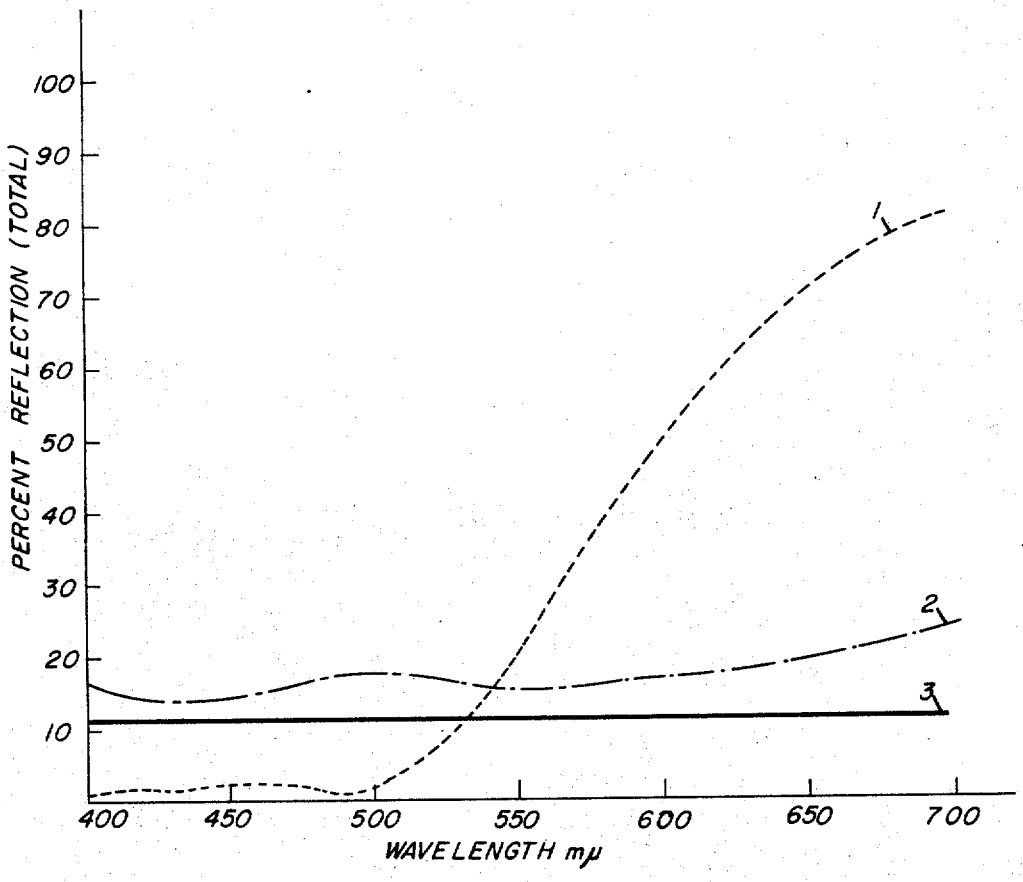
FIG. 7 is a plot of percent reflection from the front and back surfaces of an article manufactured in accordance with this invention versus wavelength.

The effectiveness of the nickel film in preventing back reflection from the filter element foil is demonstrated in FIG. 7. Reflection from the gold shown as curve 1 of FIG. 7 (which would be the same as the front reflection from a typical preferred embodiment of the invention) has been almost eliminated. Reflection from the sandwich from the nickel side itself (the reflection being shown as curve 2 of FIG. 7) is in the order of 2 percent in addition to that from a bare surface of the support (shown as curve 3 of FIG. 7). If necessary, the reflection from the support could be further lowered by the application of a coating of magnesium fluoride to the support, although this would entail an additional coating operation. Thus, the back-reflecting problem is adequately solved by the application of the reflection-reducing layer to the rear side of the optical element of this invention.

The above-described filter element comprising the metal foil "sandwiched" between the two layers of transparent material and having the reflection-reducing layer coated thereon can be mounted upon a transparent substrate consisting of almost any suitable transparent medium. For example, the substrate may be a clear glass or "plastic" sheet, or alternatively the substrate may be tinted with dyes or pigments either to produce novel and varied coloring effects or to further reduce transmittance in the visible range, if this should be found desirable. So long as sufficient translucence and transparence is provided, the nature of the substrate may vary with the whim and fancy of the producer.

Figure 4:
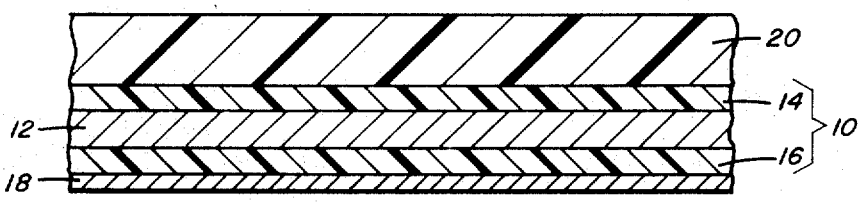
FIG. 4 is a cross-sectional view of an alternative embodiment of the article of FIG. 3.

As shown in FIG. 4, according to an alternative embodiment, the substrate 20 may be attached to the reverse side of the filter element 10, i.e. the substrate may lie contiguous to the free surface of the first transparent layer 14 and the balance of the filter element 10 constructed as described above. In this embodiment, it is free surface of the reflection-reducing layer 16 which forms the outer surface (closest to the eye) of the combined article.

These multilayer coatings are stable when exposed to normal room conditions. However, excessive handling may fingerprint and damage the coatings. Therefore, from a practical standpoint it is desirable to protect them either by overcoating with a polymeric material or by lamination to another film. Coating with a polymeric material can be achieved according to the vapor deposition method described in U.S. Pat. No. 3,322,565 to H. R. Smith, Jr., which utilizes an electron beam vapor deposition source.

Figure 5:
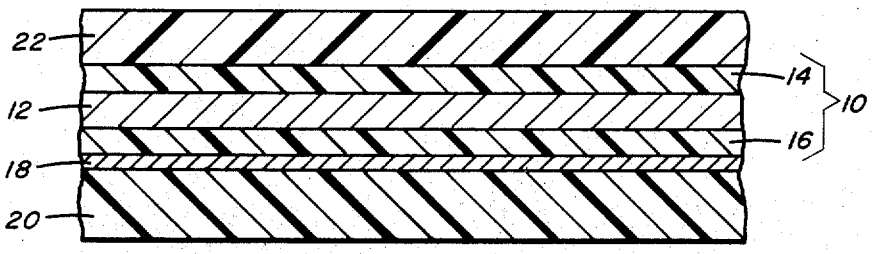
FIG. 5 is a cross-sectional view of a preferred embodiment of the article of the present invention.

Thus, according to a further preferred embodiment set out in FIG. 5, the exposed surface of the filter element 10, in this case the outer surface of the transparent layer 14, is covered with a clear protective overcoating 22 of, for example, a tough and durable polyethylene, polypropylene or poly(ethylene terephthalate) film in order to protect the softer and more easily damaged layers of the filter element from scratching, abrasion and scuffing.

Figure 6:
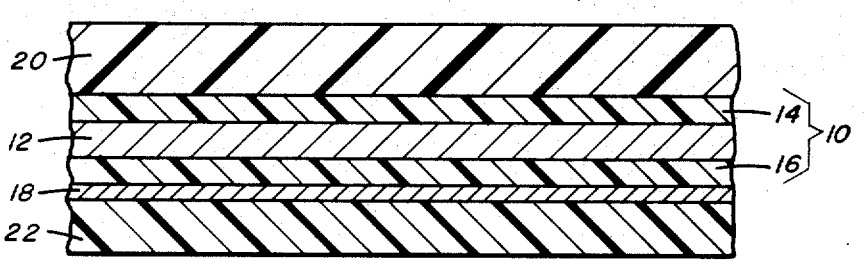
FIG. 6 is a cross-sectional view of an alternative preferred embodiment of the article of the present invention.

As shown in FIG. 6, when the substrate 20 and filter element 10 are oriented as shown in FIG. 4 described above, the protective overcoating 22 may be applied to the free surface of the reflection-reducing layer 18 which forms the outer surface of the article of FIG. 4. In this manner the reflection-reducing layer is similarly protected from damage by impact or abrasion.

This protective overlayer may consist of glass or a clear plastic material such as polyethylene, poly(ethylene terephthalate), polypropylene, some other tough plastic material, and it may be applied to the transparent layer by vapor deposition (as described above), evaporation, rolling, dipping or any other of the suitable coating methods well known to those skilled in the art.

The composition of the overcoating is limited only by the same factors which limit the composition of the substrate material, i.e., it should be transparent, compatible with the transparent and metallic layers to which it may be contiguous and be free of distortion, since it is the initial or final transmitter (depending upon the orientation of the various members of the article) of the scene perceived by the viewer.

Regardless of the orientation of the various layers, the article may be constructed by depositing the layer which lies contiguous to the substrate directly thereon and subsequently depositing the various layers of the filter element in the order shown and at the thicknesses described one on top of the other until the article is complete. For example, in the embodiment depicted in FIG. 5, the reflection-reducing layer would initially be deposited upon the substrate according to one of the methods described above. Once this initial layer was in place, the transparent zinc sulfide or other similar material layer would be coated thereon as described above and so on until each of the layers was in place and formed the composite optical element of the present invention.

Figure 1:
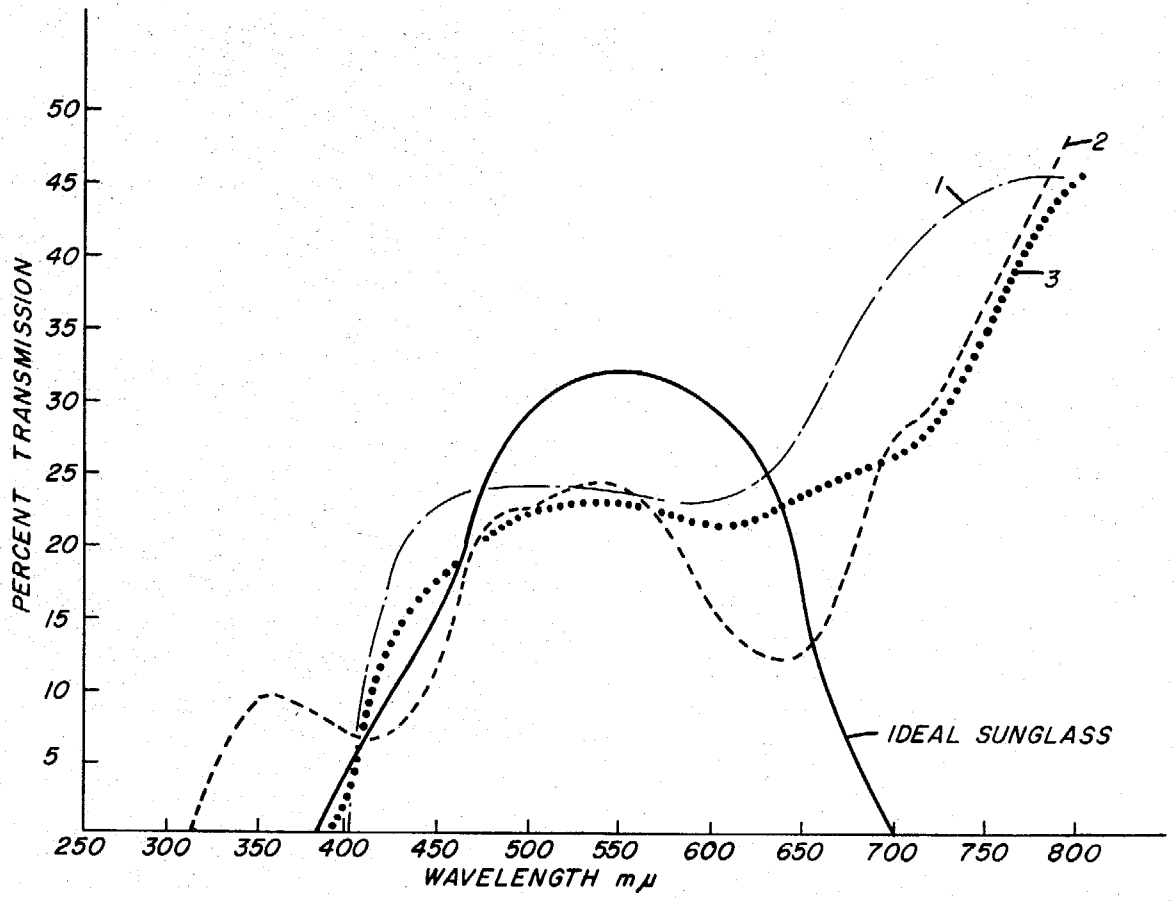
FIG. 1 is a plot of transmittance versus wavelength for a variety of different commercial and ideal sunglasses.

It should be noted at this point that in order to achieve an optical element and subsequently a sunglass whose transmittance plot approaches that shown as ideal in FIG. 1 the ranges of thickness of the various layers of the optical element are of utmost importance. Sunglasses of varying degrees of effectiveness can be produced using thicknesses outside of these ranges, but glasses of the type sought to be perfected here should be produced within the thickness ranges indicated above.

When the optical element of this invention is incorporated into a sunglass of the conventional type (the optical element serving as all or a portion of the sunglass lens, members of which there are usually two), the transparent substrate will generally comprise a concavo-convex member which is mounted in a frame in such a manner that the concave surface of the transparent substrate member lies closest the eye of the wearer when the glasses are in use. The filter element which is applied to the concavo-convex substrate is then oriented such that the reflection-reducing layer forms the concave surface of the filter element. The particular orientation of the various substate, filter element and protective layers can conform to any of the arrangements shown in FIGS. 3 through 6 so long as the above requirement for the placement of the reflection-reducing layer upon the concave surface (that surface nearest the eye of the wearer) of the filter element is met.

It is of course possible to make the sunglass lenses flat or even convexo-concave although this is neither practical nor conventional at the present time.

It is further preferable, that the layer arrangements shown in FIGS. 4 and 6 be used so that the reflection-reducing layer lies between the transparent substrate and the eye of the wearer and hence reflection from the backside of the substrate can be reduced.

The following examples will better serve to illustrate how the articles of this invention can be made and will serve to better illustrate the properties thereof.

It should further be noted that a high rate of evaporation of the metal foil layer plus no lag between deposition of the zinc sulfide or other transparent material and the metal foil layers produce best results.

EXAMPLE 1

Figure 2:
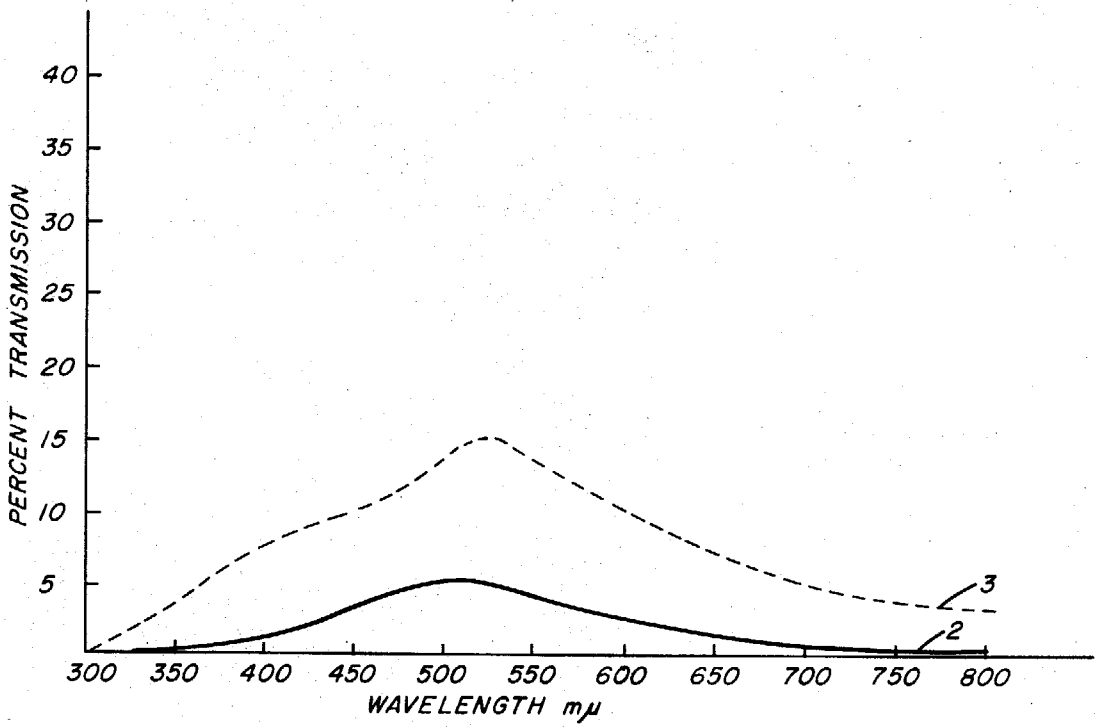
FIG. 2 is a plot of transmittance versus wavelength for a preferred embodiment of the filter element of the present invention.

A Model VEM–775 bell jar vacuum system, manufactured by Velco Instruments, Inc. is used to prepare coatings according to the following procedure. One 5 x 10 inch sheet of poly(ethylene terephthalate) or cellulose triacetate support (7 mils thick) is mounted on a domed substrate holder which is placed at a distance of 15 inches from the vapor sources. The latter consist of three tungsten boats centered in a pan-shaped arrangement under the substrate. An oscillating quartz crystal thickness monitor manufactured by Sloan Instruments Corporation is mounted in the vicinity of the substrates in the same plane. The system is closed and pumped down to a pressure of $1.0–3.0\times10^{-2}$ torr and a glow discharge struck to bombard the substrate. This cleaning operation is maintained for about 10 minutes and then the vacuum chamber is pumped down to $1.0–3.0\times10^{-5}$ torr. The complete multilayer coating is prepared without breaking the vacuum by successively firing each filament. To produce the transmission characteristics shown in FIG. 2, curve 2, nickel is deposited (first) upon a 7 mil thick triacetate support to form a layer 9 mu thick. Zinc sulfide is deposited next at a thickness of 45 mu and followed as quickly as possible with a 55 mu thick layer of gold. A final 45 mu thick layer of zinc sulfide is deposited and then the vacuum chamber brought to atmospheric pressure.

EXAMPLE 2

Using the procedure described in Example 1 above, a multilayer structure having a nickel layer thickness of 13 mu, an initial zinc sulfide layer thickness of 40 mu, a gold layer thickness of 22 mu and a final zinc sulfide layer thickness of 40 mu was formed on a cellulose triacetate support. This construction gave the result shown as curve 3 on FIG. 7.

As should be clear from the above discussion, the reflection-reducing material layer which serves as a cure for the "back-reflectivity" problem may be duplicated on the front side of the optical element should it be preferred or desirable to also limit the amount of reflection from that surface. Such an arrangement should of course call for a corresponding lessening of the thickness of the reflection-reducing material layer on the opposing surface of the optical element in most instances so that it will not be so dense as to prohibit viewing therethrough.

The invention has been described in detail with particular reference to a preferred embodiment thereof, but it will be understood that variations and modifications can be effected within the spirit and scope of the invention as described hereinabove.

I claim:

1. An article of manufacture comprising a transparent substrate and a filter element coated upon at least one side of said transparent substrate; said filter element comprising a thin foil of a metal selected from the group consisting of gold and copper, a first transparent layer and a second transparent layer contiguous to opposing surfaces of said thin foil; said first and second transparent layers having an index of refraction of at least about 1.5; and a reflection-reducing layer contiguous to the surface of at least one of said transparent layers opposing the surface which lies contiguous to said thin foil; said reflection-reducing layer consisting essentially of a material having a real optical index value within a factor of 10 [and] *of* its imaginary optical index value.

2. The article of manufacture of claim 1 wherein said transparent substrate is of glass.

3. The article of manufacture of claim 2 wherein said transparent substrate is tinted glass.

4. The article of manufacture of claim 1 wherein said transparent substrate is a plastic material.

5. The article of manufacture of claim 4 wherein said transparent substrate is a tinted plastic material.

6. The article of manufacture of claim 1 wherein said reflection-reducing layer consists of a material selected from the group consisting of nickel, iron, chromium, titanium, aluminum, lanthanum, indium, tin, lead, tantalum, tungsten, cobalt, molybdenum, osmium, iridium, platinum, yttrium, zirconium, niobium, zinc, cadmium, vanadium, hafnium, rhenium, thallium, silicon, germanium, arsenic, antimony, tellurium and alloys thereof.

7. The article of manufacture of claim 1 wherein said reflection-reducing layer consists of a material selected from the group consisting of nickel, iron, chromium, titanium and alloys of nickel.

8. The article of manufacture of claim 7 wherein said first and said second transparent layers range in thickness from about 30 to about 50 milimicrons, said reflection-reducing layer ranges in thickness from about 10 to about 20 millimicrons, and said thin foil ranges in thickness from about 22 to about 70 millimicrons.

9. The article of manufacture of claim 8 wherein said first and said second transparent layers range in thickness from about 35 to about 45 millimicrons, said reflection-reducing layer ranges in thickness from about 10 to about 18 millimicrons, and said thin foil ranges in thickness from about 35 to about 60 millimicrons.

10. The article of manufacture of claim 1 wherein said first and said second transparent layers consist essentially of a material selected from the group consisting of zinc sulfide, titanium dioxide, lead oxide and bismuth oxide.

11. The article of manufacture of claim 10 wherein said reflection-reducing layer lies contiguous to said substrate.

12. The article of manufacture of claim 11 wherein a clear protective is coated upon said first transparent layer.

13. The article of manufacture of claim 11 wherein said clear protective layer consists essentially of a material selected from the group consisting of glass and polymer films.

14. The article of manufacture of claim 7 wherein said first transparent layer lies contiguous to said transparent substrate.

15. The article of manufacture of claim 14 wherein a clear protective layer is coated upon said layer of neutral color absorbing material.

16. The article of manufacture of claim 15 wherein said clear protective layer consists essentially of a material selected from the group consisting of glass and polymer films.

17. An article of manufacture suitable for use in protecting eyes when enclosed in a frame; said article being a concavo-convex lens member comprising a concavo-convex transparent substrate and a concavo-convex filter element coated upon at least one side of said substrate; said filter element comprising a thin foil of a metal selected from the group consisting of gold and copper, a first transparent layer and a second transparent layer contiguous to opposing surfaces of said thin foil; said first and second transparent layers having an index of refraction of at least about 1.5; and a reflection-reducing layer contiguous to the surface of one of said transparent layers opposing the surface thereof which lies contiguous to said thin foil; said reflection-reducing layer consisting essentially of a material having a real optical index value within a factor of 10 [and] *of* its imaginary optical index value.

18. The article of manufacture of claim 17 wherein said reflection-reducing layer consists of a material selected from the group consisting of nickel, iron, chromium, titanium, alumnium, lanthanum, indium, tin, lead, tantalum, tungsten, cobalt, molybdenum, osmium, iridium, platinum, yttrium, zirconium, niobium, zinc, cadmium, vanadium, hafnium, rhenium, thallium, silicon, germanium, arsenic, antimony, tellurium and alloys thereof.

19. The article of manufacture of claim 18 wherein said reflection-reducing layer consists of a material selected from the group consisting of nickel, iron, chromium, titanium, and alloys of nickel.

20. The article of manufacture of claim 17 wherein said first and said second transparent layers range in thickness from about 30 to about 50 millimicrons, said reflection-reducing layer ranges in thickness from about 10 to about 20 millimicrons, and said thin foil ranges in thickness from about 22 to about 70 millimicrons.

21. The article of manufacture of claim 20 wherein said first and said second transparent layers range in thickness from about 35 to 45 millimicrons, said reflection-reducing layer ranges in thicknes from about 10 to about 18 millimicrons and said thin foil ranges in thickness from about 35 to about 60 millimicrons.

References Cited

The following references, cited by the Examiner, are of record in the patented file of this patent or the original patent.

UNITED STATES PATENTS

| | | | |
|---|---|---|---|
| 1,222,049 | 4/1917 | Tillyer | 117—33.3 X |
| 2,087,802 | 7/1937 | De Bayer-Krucsay | 117—33.3 X |
| 2,676,117 | 4/1954 | Colbert et al. | 117—124 X |
| 2,854,349 | 9/1958 | Dreyfus et al. | 117—33.3 |
| 3,118,781 | 1/1964 | Downing | 117—33.3 |
| 3,322,565 | 5/1967 | Smith | 117—106 |
| 3,400,006 | 9/1968 | Berning et al. | 117—333 |
| 3,516,720 | 6/1970 | Mauer | 117—71 X |

WILLIAM D. MARTIN, Primary Examiner

M. R. P. PERRUNE, Jr., Assistant Examiner

U.S. Cl. X.R.

117—33.3, 71 R, 124 B, 124 C, 138.8 E, 138.8 F; 161—165, 196, 214, 215, 408; 350—1, 165, 196, 311; 351—44, 163